(12) United States Patent
You

(10) Patent No.: US 11,327,172 B2
(45) Date of Patent: May 10, 2022

(54) RADAR APPARATUS AND OBJECTION DETECTION METHOD, AND SIGNAL PROCESSING APPARATUS THEREFOR

(71) Applicant: MANDO MOBILITY SOLUTIONS CORPORATION, Pyeongtaek-si (KR)

(72) Inventor: Kyung Jin You, Anyang-si (KR)

(73) Assignee: MANDO MOBILITY SOLUTIONS CORPORATION, Pyeongtaek-si (KR)

( * ) Notice: Subject to any disclaimer, the term of this patent is extended or adjusted under 35 U.S.C. 154(b) by 140 days.

(21) Appl. No.: 16/722,767

(22) Filed: Dec. 20, 2019

(65) Prior Publication Data

US 2020/0341131 A1 Oct. 29, 2020

(30) Foreign Application Priority Data

Apr. 25, 2019 (KR) .................. 10-2019-0048169

(51) Int. Cl.
| | | |
|---|---|---|
| *G01S 13/931* | (2020.01) | |
| *G01S 7/35* | (2006.01) | |
| *G01S 13/34* | (2006.01) | |
| *G01S 7/02* | (2006.01) | |

(52) U.S. Cl.
CPC .......... *G01S 13/931* (2013.01); *G01S 7/0232* (2021.05); *G01S 7/0234* (2021.05); *G01S 7/352* (2013.01); *G01S 13/347* (2013.01); *G01S 7/023* (2013.01)

(58) Field of Classification Search
CPC .... G01S 13/931; G01S 13/343; G01S 13/584; G01S 13/345; G01S 13/347; G01S 7/023; G01S 7/23; G01S 2007/356

USPC .................. 342/200, 201, 70, 60, 175, 199
See application file for complete search history.

(56) References Cited

U.S. PATENT DOCUMENTS

| | | | | |
|---|---|---|---|---|
| 6,750,809 | B1 * | 6/2004 | Cho ...................... | G01S 13/90 |
| | | | | 342/129 |
| 10,145,937 | B2 * | 12/2018 | Gupta ..................... | G01S 7/352 |
| 10,379,210 | B2 * | 8/2019 | Jansen ................... | G01S 13/931 |
| 10,955,547 | B2 * | 3/2021 | Ray ....................... | G01S 13/58 |
| 2017/0023670 | A1 * | 1/2017 | Jansen ................... | G01S 13/30 |
| 2017/0285140 | A1 * | 10/2017 | Gupta .................... | H03D 3/009 |
| 2019/0107601 | A1 * | 4/2019 | Gupta .................... | G01S 7/352 |
| 2019/0265346 | A1 * | 8/2019 | Hakobyan .............. | G01S 7/023 |
| 2019/0361113 | A1 * | 11/2019 | Ray ....................... | G01S 7/285 |
| 2019/0383926 | A1 * | 12/2019 | Crouch .................. | G01S 7/4817 |

FOREIGN PATENT DOCUMENTS

| | | |
|---|---|---|
| JP | 2009-36514 A | 2/2009 |
| JP | 2014-514567 A | 6/2014 |
| KR | 10-2011-0113926 A | 10/2011 |

* cited by examiner

*Primary Examiner* — Erin F Heard
*Assistant Examiner* — Michael W Justice
(74) *Attorney, Agent, or Firm* — Hauptman Ham, LLP

(57) ABSTRACT

An FMCW radar apparatus employing frequency hopping technique in which a center frequency of each chirp signal is variable enables the accuracy of range measurement of the radar to be improved, by determining a high resolution range value based on a composite beat signal generated by determining a beat signal for each of a plurality of chirp signals, parts of respective frequency bands of which overlap one another, and then compensating the beat signal for a phase difference value.

14 Claims, 10 Drawing Sheets

RADAR APPARATUS AND OBJECTION DETECTION METHOD, AND SIGNAL PROCESSING APPARATUS THEREFOR

CROSS-REFERENCE TO RELATED APPLICATION

This application claims the priority benefit of Korean Patent Application No. 10-2019-0048169, filed on Apr. 25, 2019 in the Korean Intellectual Property Office, the disclosure of which is incorporated herein by reference in its entirety.

BACKGROUND

Field of the Disclosure

The present disclosure relates to a radar apparatus and a method of detecting an object using the radar apparatus, and more specifically, to a technology for improving a detection resolution of a radar to distinguish or detect between two closely spaced objects (may be referred to as "radar resolution") by extending a frequency bandwidth with a plurality of chirp signals, parts of respective frequency bands of which overlap one another, in a linear frequency modulation continuous wave radar apparatus.

Description of the Background

A radar apparatus mounted on a vehicle or the like is required to have an angular resolution with a high resolution. For example, in the case of the vehicle radar for preventing and avoiding forward collisions, it is possible to determining a cut-in situation by determining an angle of arrival of laser radiation when another vehicle in an adjacent lane ahead cuts into and/or cuts out of the lane ahead of a host vehicle. That is, when the cut-in and cut-out situations occur, it is possible to reduce a probability of false target detection through the angular resolution with a high resolution and ensure driver safety by predicting a probability of a potential collision.

Further, the radar for the vehicle is required to have a mid/long range detection function to detect a remote object in a relatively narrow angle, and a short range detection function to detect a close object in a relatively wide angle, by using a single antenna assembly.

Further, a typical radar apparatus has an antenna structure in which an array of receiving antennas is arranged to obtain a high angular resolution. That is, the typical radar apparatus employs a structure capable of improving an angular resolution by arranging multiple channels provided by the receiving antennas.

In the vehicle-mounted radar, it is necessary to integrate the mid/long range radar and the short range radar. The integration of the mid/long range radar and the short range radar is normally performed such that transmitting antennas are used separately and receiving antennas are commonly used. One of disadvantages to this case is that, as the performance of the ability to resolve or the like in the mid/long range radar is decreased and the performance of detection range or the like in short range radar is decreased, each performance may not be maximized.

As radar sensors for the vehicle, a single pulse technique, a frequency modulation continuous wave (FMCW) technique, a frequency shift keying technique, and the like are used according to types of electromagnetic waves employed,
Among these techniques, the FMCW is used a lot that employs continuous waves in the form of up/down chirps or up/down ramps by performing linear frequency modulation of continuously increasing/decreasing frequency in a predetermined time interval.

A width from the lowest frequency to the highest frequency occupied by one or more signal (s) resulted from the linear frequency modulation is referred to as a frequency band (BW or $\Delta F$), and if a specific frequency band is equal to one another, a range resolution is equal regardless of the absolute values of the corresponding frequencies occupied by one or more modulated signal(s).

Since when the range resolution is x, two objects, a difference in respective distances of which from a radar is less than or equal to x, are recognized as one object, a lower range resolution value means a higher performance.

Employing a wider frequency band for a higher range resolution causes a maximum detection distance to reduce.

Accordingly, radar signals are classified into a radar signal occupying a narrow frequency band and a radar signal occupying a wide frequency band, and respective radar signals are used for long-range detection and short-range detection.

Meanwhile, in case an adjacent vehicle uses an equal radar signal to the host vehicle, interference may occur between radar signals; therefore, the performance of detecting an object may become poor.

To address this issue, in the case of some radar sensors, frequency hopping is used that allows a center frequency of an up-chirp signal to be changed to another frequency for each modulation period.

However, in the FMCW radar employing such frequency hopping, as a certain phase difference between beat signals corresponding to multiple up-chirps occurs, there is a possibility that detection performance may become poor, and since a frequency band occupied by each up-chirp has a constant value, the range resolution remains constant; thus, there is a certain limitation in improving the resolution.

SUMMARY

Accordingly, the present disclosure is directed to radar apparatuses, methods of detecting objects, and signal processing apparatuses that substantially obviate one or more problems due to limitations and disadvantages of the prior art.

To address such issues, it is one object of the present disclosure to provide a radar apparatus capable of improving a resolution for detecting an object by expanding a frequency band in a FMCW radar employing a frequency hopping technique.

It is another object of the present disclosure to provide a radar apparatus or the like capable of improving a detection resolution of a radar by extending a frequency bandwidth with a plurality of chirp signals, parts of respective frequency bands of which overlap one another.

It is further another object of the present disclosure to enable a FMCW radar apparatus employing a frequency hopping technique in which a center frequency of each chirp signal is variable to provide an effect equal to that obtained by expanding a frequency bandwidth and as a result, improve a detection resolution of a radar, by determining a beat signal for each of a plurality of chirp signals, parts of respective frequency bands of which overlap one another, compensating the beat signal for a phase difference value, and generating a composite beat signal.

In accordance with one aspect of the present disclosure, a radar apparatus is provided that comprises: an antenna assembly, a signal transceiver transmitting a linear frequency modulation signal and receiving a signal reflected from an object via the antenna assembly, and a signal processor extracting information on the object by controlling the transceiver and processing the received reflected signal, the signal processor comprising a function of generating and transmitting a plurality of chirp signals, each of which has a different center frequency from one or more previous chirp signal (s) for each modulation period while having an individual frequency band equal to the one or more previous chirp signal(s), a function of deriving a first chirp signal and a second chirp signal that overlap each other in a fractional frequency band of 0 or more among the plurality of chirp signals, a function of determining a phase difference value between a first beat signal corresponding to the first chirp signal and a second beat signal corresponding to the second chirp signal, a function of generating a composite beat signal by compensating at least one of the first beat signal and the second beat signal for the phase difference value between the first beat signal and the second beat signal, and a function of determining a high resolution range value of the object by using the composite beat signal.

Further, the signal processor can comprise a further function of deriving a third chirp signal that overlaps at least one of the first chirp signal or the second chirp signal in the fractional frequency band of 0 or more, and generating a third beat signal corresponding to the third chirp signal, and generate a composite beat signal by compensating at least one of the first beat signal, the second beat signal, or the third beat signal for a phase difference value between the third beat signal and at least one of the first beat signal or the second beat signal.

In this case, the phase difference value may be proportional to the product $(R*\Delta fc)$ of the range value R of the object and a center frequency difference value $\Delta fc$ that is a difference value between a first center frequency $fc1$ of the first chirp signal and a second center frequency $fc2$ of the second chirp signal.

Meanwhile, the resolution of the high resolution range value determined by the composite beat signal may be proportional to the center frequency difference value $\Delta fc$ that is the difference value between the first center frequency $fc1$ of the first chirp signal and the second center frequency $fc2$ of the second chirp signal.

Further, the resolution of the high resolution range value determined by the composite beat signal may be proportional to a value $(2BWe-BWo)$ obtained by subtracting an overlapping frequency band $BWo$ from a value corresponding to two times the frequency band $BWe$.

Further, the signal processor can perform a detection algorithm for extracting information on the object determined by using each chirp signal, and only when an object detection peak obtained by performing the detection algorithm is not clear whether it is a single object or a plurality of objects, perform the function of generating the composite beat signal by using the overlapping chirp signals and the function of determining the high resolution range value.

In accordance with another aspect of the present disclosure, a signal processing apparatus employed in a radar sensor apparatus for a vehicle is provided that comprises: a signal generator generating and transmitting a plurality of chirp signals, each of which has a different center frequency from one or more previous chirp signal(s) for each modulation period while having an individual frequency band equal to the one or more previous chirp signal(s), a beat signal compositing circuit deriving a first chirp signal and a second chirp signal that overlap each other in a fractional frequency band of 0 or more among the plurality of chirp signals, determining a phase difference value between a first beat signal corresponding to the first chirp signal and a second beat signal corresponding to the second chirp signal, and generating a composite beat signal by compensating at least one of the first beat signal and the second beat signal for the phase difference value between the first beat signal and the second beat signal, and a range information determining circuit determining a high resolution range value of an object having a range resolution greater than a range resolution by the individual frequency band by using the composite beat signal.

In accordance with further another aspect of the present disclosure, a method of detecting an object, the method comprising: generating and transmitting a plurality of chirp signals, each of which has a different center frequency from one or more previous chirp signal (s) for each modulation period while having an individual frequency band equal to the one or more previous chirp signal(s), deriving a first chirp signal and a second chirp signal that overlap each other in a fractional frequency band of 0 or more among the plurality of chirp signals, determining a phase difference value between a first beat signal corresponding to the first chirp signal and a second beat signal corresponding to the second chirp signal, generating a composite beat signal by compensating at least one of the first beat signal and the second beat signal for the phase difference value between the first beat signal and the second beat signal, and determining a range value of an object having a range resolution greater than a range resolution by the individual frequency band by using the composite beat signal.

As described above, in accordance with embodiments of the present disclosure, it is possible to provide a radar apparatus capable of improving a resolution for detecting an object by expanding a frequency band in a FMCW radar employing a frequency hopping technique.

That is, it is possible to provide an effect of improving the radar resolution by extending a frequency bandwidth with chirp signals, parts of respective frequency bands of which overlap one another.

More specifically, in a FMCW radar apparatus employing a frequency hopping technique in which a center frequency of each chirp signal is variable, it is possible to provide a resolution improving effect substantially equal to that obtained by expanding a frequency bandwidth, by determining a beat signal for each of a plurality of chirp signals, parts of respective frequency bands of which overlap one another, compensating each beat signal for a phase difference value, and generating a composite beat signal.

DETAILED DESCRIPTION

Figure 1:
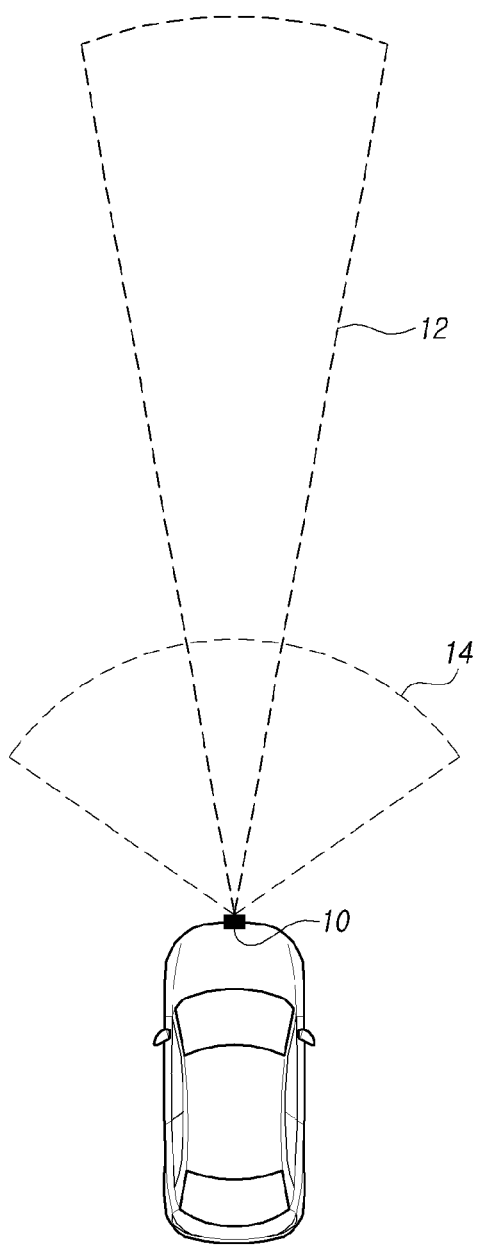
FIG. 1 is a diagram illustrating an example of detecting an object by a typical radar sensor for a vehicle, and examples of a mid/long range detection area and a short range detection area.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

Terms, such as first, second, A, B, (A), or (B) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

FIG. 1 is a diagram illustrating an example of detecting an object by a typical radar sensor for a vehicle, and examples of a mid/long range detection area and a short range detection area.

Referring to FIG. 1, when detecting an object adjacent to a host vehicle by using a radar sensor for a vehicle, it is required to have capabilities to detect a mid/long range target ahead of the vehicle and to detect a short range target adjacent to the vehicle.

In a vehicle on which a radar sensor is mounted, various types of driver assistance systems (DAS) are used to assist driving of a driver.

In an adaptive cruise system (ACC) tracking vehicles ahead among the driver assistance systems, it is required to detect a mid/long range target ahead in the forward direction of the host vehicle.

Meanwhile, it is required to detect obstacles adjacent to the vehicle with high accuracy, in the autonomous emergency braking (AEB) system or the autonomous emergency steering (AES) system for enabling the vehicle to be braked or steered urgently when an obstacle ahead is present, the lane changing assistance (LCA) system for preventing the vehicle from colliding with an obstacle in an adjacent lane at the time of lane change, or the like.

To meet such requirements, as in FIG. 1, the radar sensor apparatus for a vehicle is required to have capabilities to detect both a long detection area 12 characterized by a relatively narrow detection angle and a long range detection range for mid/long range detection and a short detection area 14 characterized by a relatively wide detection angle and a short range detection range.

To do this, for mid/long range detection, the radar sensor apparatus is required to transmit a transmission signal in the pattern of a mid/long range transmission beam, and for short range detection, transmit a transmission signal in the pattern of a shore range transmission beam different from that of the mid/long range transmission beam.

Thus, a mid/long range radar and a short range radar are required to be integrated in the vehicle-mounted radar, and as a method of integrating the mid/long range radar and the short range radar, transmitting antennas can be separately used, and receiving antennas can be commonly used.

Figure 2:
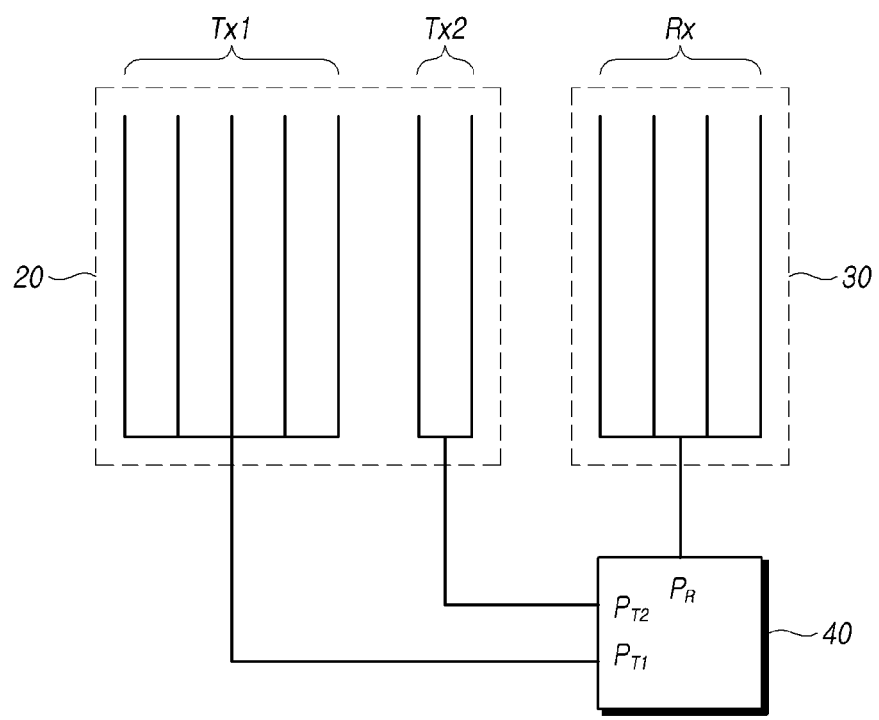
FIG. 2 is a diagram illustrating an example hardware configuration of a radar sensor apparatus in accordance with embodiments of the present disclosure.

FIG. 2 is a diagram illustrating an example hardware configuration of a radar sensor apparatus in accordance with embodiments of the present disclosure.

Referring to FIG. 2, a vehicle-mounted radar sensor apparatus according to embodiments of the present disclosure comprises an antenna assembly including a transmitting antenna assembly 20 and a receiving antenna assembly 30. The transmitting antenna assembly 20 comprises a first transmitting antenna Tx1 for a mid/long range for long range detection and a second transmitting antenna Tx2 for a short range for short range detection.

A receiving antenna Rx is commonly used in both a mid/long range detection mode and a short range detection mode. The two transmitting antennas Tx1 and Tx2 are arranged to be spaced apart from each other, and the receiving antenna Rx is arranged on one side of the transmitting antennas Tx1 and Tx2.

In this case, the second transmitting antenna Tx2 for the short range may be disposed between the first transmitting antenna Tx1 for the mid/long range and the receiving antenna Rx; however, embodiments of the present disclosure are not limited to a specific arrangement.

The radar sensor apparatus further comprises a signal processor 40, such as a digital signal processor (DSP).

The signal processor controls the radar sensor apparatus to transmit a signal via the transmitting antenna assembly and to receive a signal reflected from an object via the receiving antenna assembly, and extracts information on the object, such as a distance, a velocity, an angle, etc. related to the object based on the received signal.

Meanwhile, the radar sensor apparatus can be classified into a pulse radar, a frequency modulation continuous wave (FMCW) radar, a frequency shift keying (FSK) radar, and the like according to in the form of a signal used.

The FMCW radar uses a chirp signal or a ramp signal, which is a signal whose frequency increases over time, and extracts information on an object by using a time difference between a transmitting wave and a receiving wave and a Doppler frequency shift.

Further, the vehicle-mounted radar sensor can use time division multiplexing technique for a mid/long range detection and a short range detection.

That is, during a first detection period, the vehicle-mounted radar sensor detects a long range object by transmitting a transmitting wave in the pattern of a transmitting beam for lone range detection and receiving a reflected wave corresponding to the transmitting wave. During a second detection period, the vehicle-mounted radar sensor detects a short range object by transmitting a transmitting wave in the pattern of a transmitting beam for short range detection and receiving a reflected wave corresponding to the transmitting wave.

It should be noted that the radar sensor apparatus according to embodiments for the present disclosure doesn't necessarily need to use separate transmitting antennas for long range detection and short range detection. For example, a chirp signal may be transmitted via only a single transmitting antenna.

Figure 3:
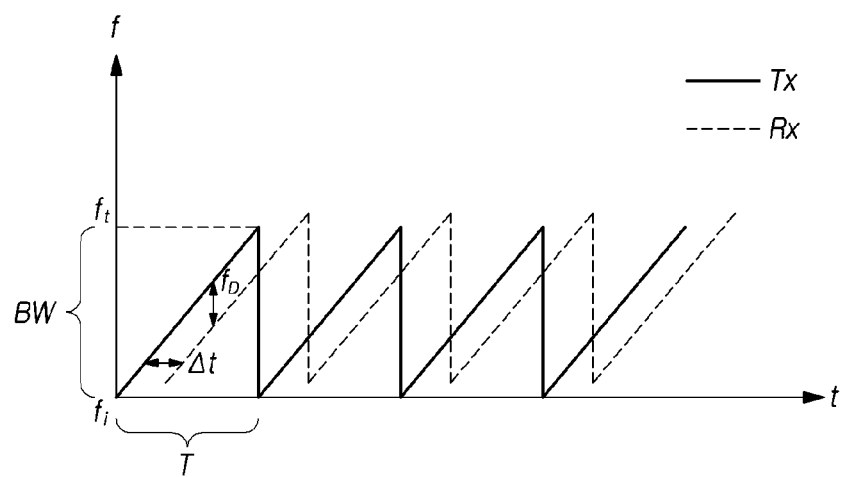
FIG. 3 illustrates an example signal waveform and an example principle of detecting a range in a frequency modulation continuous wave (FMCW) radar.
Figure 3:
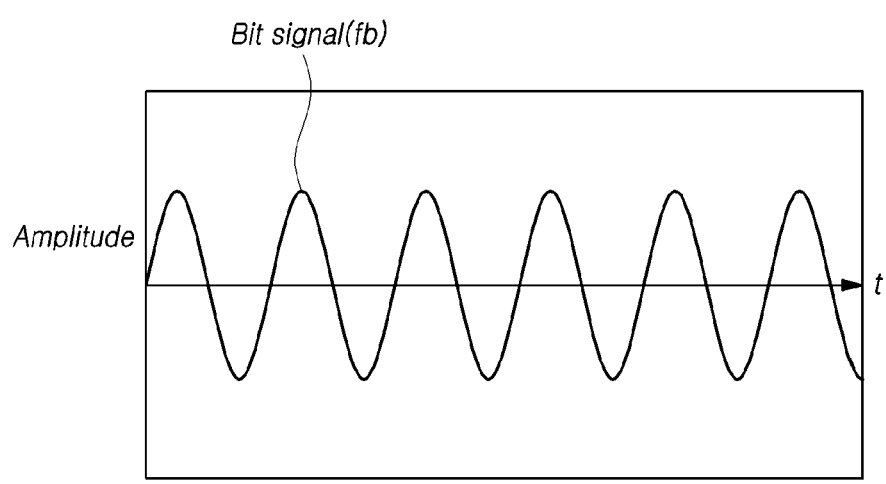

FIG. 3 illustrates an example signal waveform and an example principle of detecting a range in a frequency modulation continuous wave (FMCW) radar.

A signal modulation scheme for the FMCW radar may be implemented by using several waveforms, the most representative of which is to use a sawtooth waveform of a signal as shown in FIG. 3.

That is, according to this scheme using the sawtooth waveform, during a sweep time or a sweep repetition period T which is a predefined time period, an up-chirp signal whose frequency linearly increases from a starting frequency fi to an ending frequency ff is repeatedly generated and transmitted, and then a signal reflected from an object is received.

Herein, the sweep time is used as a meaning equal to a modulation period.

In FIG. 3, a solid line represents a transmission waveform and a dotted line represents a reception waveform.

In such a sawtooth signal model, one chirp signal has an individual frequency band BW which corresponds to a difference (ff-fi) between the ending frequency and the starting frequency, and starting frequencies of all chirp signals are equal as fi.

Referring to FIG. 3, the transmitting wave (the solid line) and the receiving wave (the dotted line) have an equal form, but a certain shift occurs on the time axis and the frequency axis.

A range to an object, a relative speed between objects, or the like can be determined by using a time difference or a frequency shift between the transmitting wave and the receiving wave.

More specifically, if the transmitting wave and the receiving wave are mixed (i.e., convoluted), a beat signal as shown in the lower view of FIG. 3 is generated, and this beat signal has a form of a sinusoidal wave with a certain beat frequency fb.

In this case, the beat frequency fb of the beat signal has a value proportional to a range R to an object, and more specifically, the range R to the object can be determined as in following Equation 1.

$$R = \frac{fb \cdot T \cdot c}{2 \cdot BW} \quad \text{[Equation 1]}$$

In Equation 1, BW represents an individual frequency bandwidth of a chirp signal; T represents a sweep time; c is the speed of light; and fb represents a beat frequency of a beat signal.

Thus, in the sawtooth signal model as shown in FIG. 3, the range R to an object can be determined by using repeated chirp signals in the form of the sawtooth, generating a beat signal by mixing the transmitting wave and the receiving wave, and then measuring a beat frequency.

Meanwhile, a range difference ΔR that is a difference value between the ranges R to objects or between two surfaces can be determined as in following Equation 2.

$$\Delta R = \frac{c}{2 \cdot BW} \quad \text{[Equation 2]}$$

The range difference ΔR is in inverse proportional to the BW, which is a frequency band/bandwidth of a chirp signal.

The inverse of the range difference becomes a resolution of a range, i.e. the range resolution.

That is, as the range difference is smaller, the ability to discriminate a range to an object increases; therefore, the range resolution (1/ΔR) is characterized as being in proportional to a frequency band/bandwidth BW of a chirp signal.

Meanwhile, in a situation where a plurality of vehicles employ an equal radar, there is a possibility that a radar signal from an adjacent vehicle may cause interference with the vehicle-mounted radar; therefore, it is necessary to provide a way to avoid such a potential situation.

In particular, since a frequency band used for mid/long range detection, such as 77, 79, 94 Hz, or the like, may overlap with another according to each country's policy on the vehicle-mounted radar, there is a possibility that if a plurality of vehicles use all or some of chirp signals in an equal frequency band as in FIG. 3, the interference may occur.

For example, when both a host vehicle and one or more adjacent vehicle(s) uses of all or some of waveforms of a signal in the same frequency band BW as in FIG. 3, since a signal transmitted or received by the host vehicle and a signal transmitted or received by a radar of an adjacent vehicle overlap, therefore, the host vehicle cannot distinguish its radar signal from that of the adjacent vehicle, and thus, the performance of the radar sensor may become poor.

To prevent interference between radars, it is possible to provide a method of enabling identification between radars using the same technique to be realized by forcing identification codes to be used; a method of enabling a signal processor of a radar to remove other signals except for signals transmitted or received by the host vehicle; and a method of allowing respective radars to use different signal waveforms.

Figure 4:
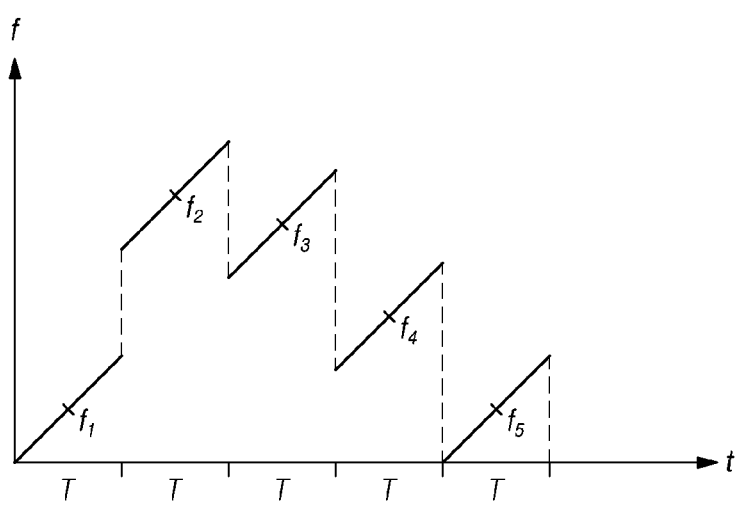
FIG. 4 illustrates an example signal waveform in the FMCW radar employing frequency hopping for avoiding interference.

An example method of enabling a radar to use one or more different signal waveform(s) is referred to as a frequency hopping technique as shown in FIG. 4.

FIG. 4 illustrates an example signal waveform used in the FMCW radar employing the frequency hopping technique for avoiding interference.

Referring to FIG. 4, a radar sensor generates chirp signals with an individual frequency band/bandwidth BWe for each sweep time T, while a center frequency of the chirp signal can be different from one or more previous chirp signal(s).

That is, the radar sensor generates chirp signals with the same form and individual frequency band, but changes a start frequency or a center frequency of the chirp signal for each sweep time.

FIG. 4 illustrates that 5 chirp signals, respective center frequencies of which are f2, f3, f4, and f5, are consecutively generated.

If the frequency hopping technique is used, it is possible to distinguish between radar signals by differentiating an order or size of signals in the frequency hopping for each radar sensor.

Meanwhile, in even a case where the frequency hopping technique as in FIG. 4 is used, a range to an object is determined on a chirp signal basis, and Equation 1 and Equations are equally applied.

That is, even when the frequency hopping technique is used as in FIG. 4, the range R to an object and range resolution (1/ΔR) are determined by an individual frequency band BW of each chirp signal and a beat frequency fb.

Accordingly, even when the frequency hopping technique is used as in FIG. 4, interference from other radar(s) may be avoided, however, which means that the accuracy of extracted information is not improved.

On the other hand, one disadvantage of the frequency hopping technique as in FIG. 4 is that the frequency bandwidth used as a whole becomes larger than that of the sawtooth waveform model as in FIG. 3.

Further, while beat signals of chirp signals with the same center frequency as in FIG. 3 are in phase, beat signals of chirp signals whose center frequencies are different are out of phase; therefore, there is a possibility that the accuracy of extracted information may be decreased due to the phase difference.

For example, when extracting information on a range of an object by processing beat signals corresponding to N chirp signals, a phase difference occurs in respective beat signals corresponding to the chirp signals due to a difference in center frequencies of N chirp signals; therefore, there may occur a problem that extracted range information becomes inexact.

To address such issues, in accordance with embodiments of the present disclosure, a radar apparatus and a method are provided for improving a resolution for detecting an object by expanding a frequency band in a FMCW radar employing the frequency hopping technique.

More specifically, in the FMCW radar apparatus employing the frequency hopping technique in which a center frequency of each chirp signal is variable, the radar apparatus and the method provides a resolution improving effect substantially equal to that obtained by expanding a frequency bandwidth, by determining a beat signal for each of a plurality of chirp signals, parts of respective frequency bands of which overlap one another, compensating each beat signal for a phase difference value, and generating a composite beat signal.

Figure 5:
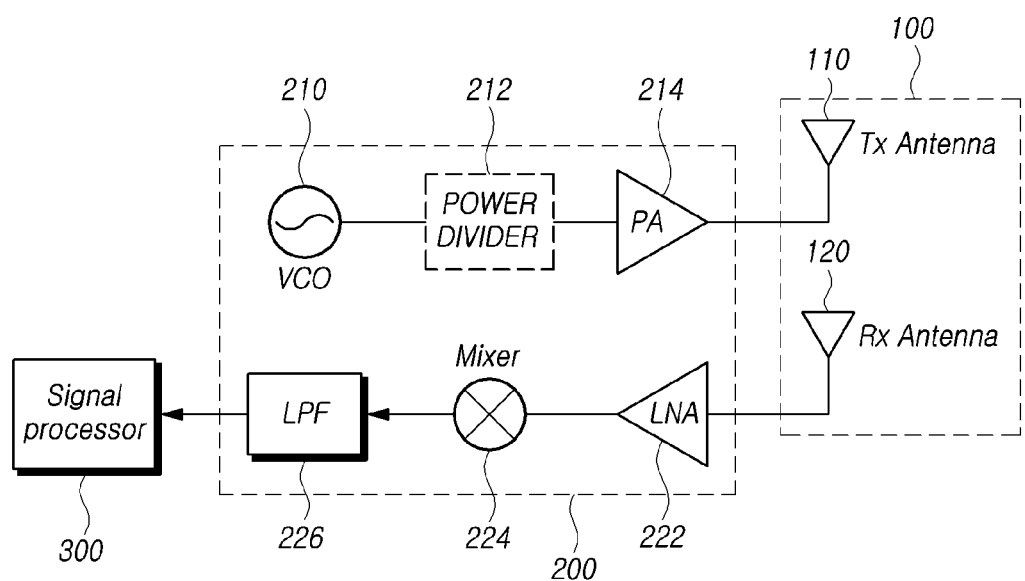
FIG. 5 is a functional diagram illustrating configuration of the radar sensor apparatus in accordance with embodiments of the present disclosure.

FIG. 5 is a functional diagram illustrating configuration of a radar sensor apparatus in accordance with embodiments of the present disclosure.

The radar sensor apparatus according to one or more embodiments can comprise an antenna assembly 100, a transceiver 200 and a signal processor 300.

The signal processor 300 herein may be referred to as a processor, a processing system, a signal processing circuitry, a signal processing apparatus or a signal processing device.

The signal transceiver 200 transmits a linear frequency modulation signal and receives a signal reflected from an object via the antenna assembly according to the control of the signal processor 300.

Some or a part of one or more configuration(s) of each or all of the antenna assembly and the signal transceiver can constitute a front end module FEM of the radar sensor apparatus, and some or a part of one or more configuration(s) of each or all of the signal processor and the signal transceiver can constitute a back end module BEM of the radar sensor apparatus.

The signal processor 300 extracts information on an object by controlling the signal transceiver and processing the received reflected signal.

In particular, the signal processor 300 according to one or more embodiments can improve a range resolution by compositing a plurality of chirp signals.

More specifically, the signal processor 300 for compositing the plurality of chirp signals can comprises i) a function of generating and transmitting a plurality of chirp signals, each of which has a different center frequency from one or more previous chirp signal(s) for each modulation period while having an individual frequency band equal to the one or more previous chirp signal(s), ii) a function of deriving first and second chirp signals that overlap each other in a fractional frequency band of 0 or more among the plurality of chirp signals, iii) a function of determining a phase difference value between a first beat signal corresponding to the first chirp signal and a second beat signal corresponding to the second chirp signal, and iv) a function of generating a composite beat signal by compensating at least one of the first beat signal and the second beat signal for the phase difference value between the first beat signal and the second beat signal, and v) a function of determining a range value of an object by using the composite beat signal.

Thus, the resolution of the range value determined from the composite beat signal may become greater than a range resolution by the individual frequency band.

Hereinafter, the radar sensor apparatus according to embodiments of the present disclosure will be discussed in detail.

The antenna assembly 100 can comprise a transmitting antenna 110 and a receiving antenna 120, and the transmitting antenna can include a long range transmitting antenna and a short range transmitting antenna.

Each of the transmitting antenna and the receiving antenna can comprise one or more micro strip array antenna elements; however, embodiments of the present disclosure are not limited thereto.

More specifically, the antenna assembly according to one or more embodiments can comprise a transmitting antenna assembly including one or more first transmitting antenna(s) and a second transmitting antenna spaced apart from the first transmitting antenna(s) by a first vertical distance B in a first direction perpendicular to the ground, and a receiving antenna assembly including one or more receiving antenna(s) disposed in a vertical location equal to the first transmitting antenna(s).

Thus, in the situation where two transmitting antennas are disposed to be spaced apart from by a certain vertical distance in the first direction perpendicular to the ground, it is possible to extract both vertical information and horizontal information on the object in a mid/long range detection mode and a short range detection mode, by transmitting simultaneously transmission signals via the two transmitting antennas, and receiving and processing signals reflected from an object.

Further, in another embodiment, the antenna assembly 100 can comprise: a transmitting antenna assembly including a first transmitting antenna group including a first transmitting antenna extending in a first direction of vertical directions, and a second transmitting antenna group including a second transmitting antenna and a third transmitting antenna which extend in a second direction opposite to the first direction and are spaced apart from the first transmitting antenna by a first vertical distance; and a receiving antenna assembly including a first receiving antenna group including a first receiving antenna and a second receiving antenna which extend in the first direction, and a second receiving antenna group including a third receiving antenna and a fourth receiving antenna which extend in the second direction and are spaced apart from the first receiving antenna group by a second vertical distance.

Thus, in the situation where one or more of the transmitting antenna(s) are disposed in the first direction perpendicular to the ground, and the remaining transmitting antenna(s) are disposed in the second direction opposite to the first direction, and one or more of the receiving antenna(s) are disposed in the first direction and the remaining receiving antenna(s) are disposed in the second direction, it is possible to improve the ability to resolve an angle in vertical and horizontal directions in both mid/long range detection and short range detection, by suitably selecting one or more transmitting antenna(s) transmitting a signal and one or more receiving antenna(s) receiving a signal reflected from an object.

It should be noted that embodiments of the present disclosure are not limited to the structures of the antenna assembly according to the embodiments described above; therefore, other structures of the antenna assembly may be available as well.

The radar sensor comprises one or more transmitting antennas transmitting a radar signal, and one or more receiving antennas receiving a signal reflected from an object.

Meanwhile, the radar sensor according to one or more embodiments can employ a signal transmission and reception technique based on a multidimensional antenna array and a multiple input multiple output (MIMO) in order to form a virtual antenna aperture greater than an actual antenna aperture.

For example, a two-dimensional antenna array can be employed to accomplish the accuracy of an angle to the vertical and/or the horizontal and a higher resolution. In case the two-dimensional radar antenna array is used, signals are transmitted and received by two separate scans (time multiplexed) horizontally and vertically, and the MIMO can be used separately from the horizontal and vertical scans (time multiplexed) by the two-dimensional antenna array.

More specifically, the radar sensor according to one or more embodiments can comprise a two-dimensional antenna array including a transmitting antenna assembly including a total of 12 transmitting antennas Tx and a receiving antenna assembly including a total of 16 receiving antennas Rx; as a result, a total of 192 virtual receiving antennas can be arranged.

In this case, the transmitting antenna assembly can comprise three transmitting antenna groups, each of which includes four transmitting antennas, and a first transmitting antenna group of the three transmitting antenna groups may be spaced apart from a second transmitting antenna group by a certain distance in the vertical direction, and the first or second transmitting antenna group may be spaced apart from a third transmitting antenna group by a certain distance D in the horizontal direction.

Further, the receiving antenna assembly can comprise four receiving antenna groups, each of which includes four receiving antennas, and each receiving antenna group is disposed to be spaced apart from one another in the vertical direction. This receiving antenna assembly may be disposed between the first transmitting antenna group and the third transmitting antenna group, which are spaced apart from each other in the horizontal direction.

Further, in another embodiment, in a case where the antenna assembly of the radar sensor comprises the two-dimensional antenna array, each antenna patch can be disposed in a diamond or rhombus shape; therefore, unnecessary side lobes can be reduced.

Alternatively, the two-dimensional antenna arrangement can comprise a V-shape antenna array in which a plurality of radiating patches is arranged in a V-shape, and more specifically, comprise two V-shape antenna arrays. In this case, a single feed is performed to the apex of each V-shape antenna array.

Alternatively, the two-dimensional antenna arrangement can comprise a X-shape antenna array in which a plurality of radiating patches is arranged in a X-shape, and more specifically, comprise two X-shape antenna arrays. In this case, a single feed is performed to the center of each X-shape antenna array.

Further, the radar sensor according to one or more embodiments can employ the MIMO antenna system to accomplish the accuracy of an angle to the vertical and/or the horizontal and a higher resolution.

More specifically, in the MIMO system, each transmitting antenna can transmit a signal with a waveform independent of one another. That is, each transmitting antenna can transmit a signal with a waveform independent of the other transmitting antenna(s), and then each receiving antenna can determine which transmitting antenna a received signal from an object is transmitted from due to the using of the independent waveform for each transmitting antenna.

Further, the radar sensor according to one or more embodiments can comprise a radar housing in which a substrate on which the antenna assembly is disposed and a circuitry are accommodated, and a radome served as an enclosure of the radar housing. The radome can be formed of a material capable of decreasing attenuation of radar signals transmitted and received, and constitute a front or rear bumper, a grille, or a side body of the vehicle, or an exterior surface of one or more components of the vehicle.

That is, the radome of the radar sensor can be disposed inside of the bumper, the grille, or the body of the vehicle, or be disposed as a part of a component constituting the exterior surface of the vehicle, such as a part of the bumper, the grille, or the body of the vehicle. Therefore, the radome can improve the aesthetics of the vehicle and provide the convenience of mounting the radar sensor.

The radar sensor or the radar sensor apparatus/system according to the present disclosure can comprise one or more of a front detection radar sensor mounted in the front of the vehicle, a rear detection radar sensor mounted in the rear of the vehicle, and a side or side-rear detection radar sensor mounted in a side of the vehicle, which can constitute at least one radar sensor subsystem. The radar sensor or the radar sensor apparatus/system can process data by analyzing a transmitting signal and a receiving signal, and as a result, extract information on an object. To do this, the radar sensor or the radar sensor apparatus/system can comprise an electronic or controlling circuitry ECU, or a processor. Data transmission or signal communication from the radar sensor to the electronic or control circuitry ECU or the processor can use a communication link, such as a vehicle network bus, or the like.

The signal transceiver 200 of the radar sensor apparatus according to embodiments of the present disclosure transmits a linear frequency modulation signal and receives a signal reflected from an object via the antenna assembly according to the control of the signal processor 300.

Specifically, a transmitter of the signal transceiver can comprise a voltage controlled oscillator (VCO) 210, a power divider 212, and a power amplifier 214.

The voltage controlled oscillator 212 can generate a sinusoidal wave with a constant frequency by the control of a pulse modulation controller, and the power divider 212 can switch, and divide power into, a plurality of transmitting antennas or receiving antennas.

The power amplifier 214 amplifies an amplitude of a wave of the linear frequency modulation signal transmitted via the transmitting antenna.

A receiver of the signal transceiver can comprise a low noise amplifier (LNA) 222 for amplifying a signal received by the receiving antenna 120 without adding any noise or with a very low noise figure, a mixer 224 for mixing the transmitted signal and the received signal, a low-pass filter (LPF) 226, and the like.

The mixer 224 generates a beat signal by convoluting a wave of the transmitted signal and a wave of the received signal corresponding to the transmitted signal wave, as shown in FIG. 3.

The low-pass filter 226 passes only low frequency corresponding to a beat frequency of the beat signal generated from the mixer.

The signal transceiver 200 can be operated by the controlling of the signal processor 300.

Meanwhile, the signal processor 300 according to embodiments of the present disclosure extracts a beat frequency from a beat signal corresponding to each chirp signal, and using this, performs a basic function of determining information on the object, such as a distance, a velocity, an angle, etc.

Further, the signal processor 300 according to embodiments of the present disclosure can compensate each beat signal corresponding to a plurality of chirp signals, parts of respective frequency bands of which overlap one another, for a phase difference value, generate a composite beat signal, and determine a range value with a high resolution by using the composite beat signal. The operation of the signal processor 300 will be described in detail below, referring to FIGS. 6 to 9.

Figure 6:
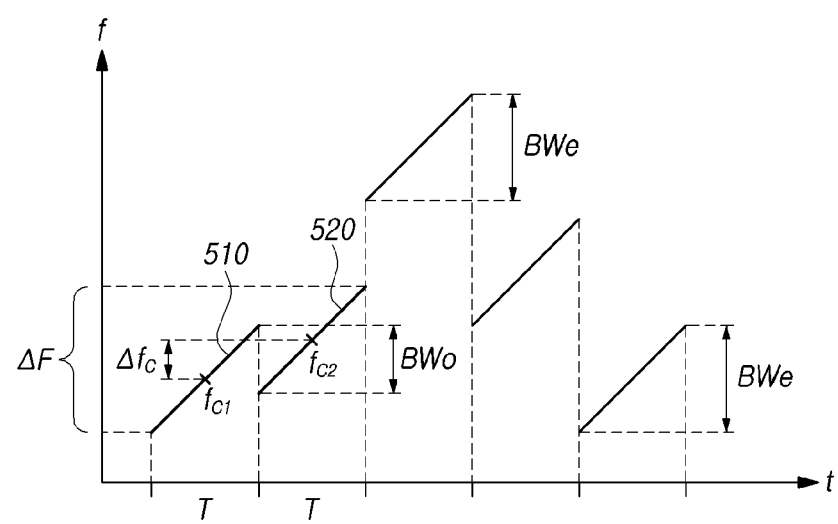
FIG. 6 illustrates an example signal waveform, in which parts of two chirp signals overlap each other, which is used in the radar sensor apparatus in accordance with embodiments of the present disclosure.
Figure 7:
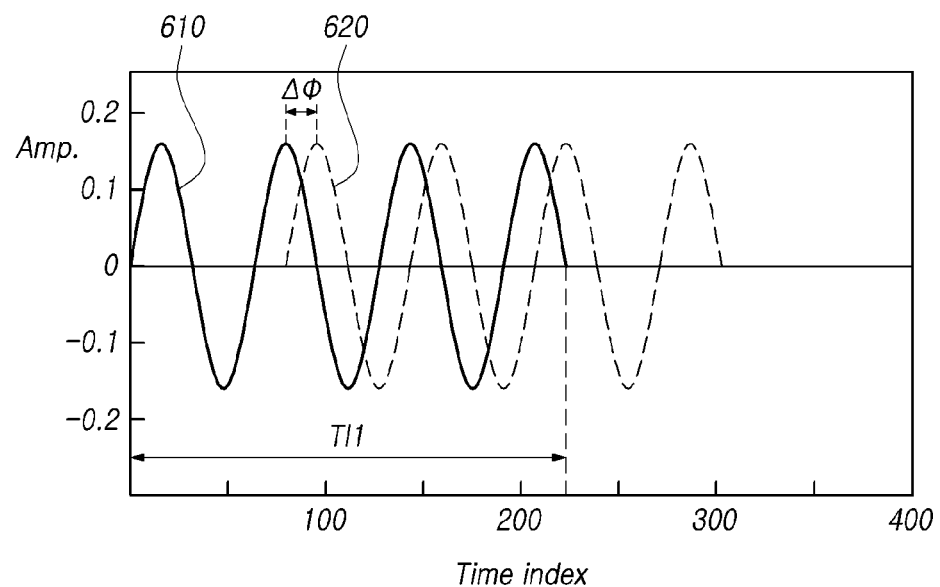
FIG. 7 illustrates waveforms of first and second beat signals corresponding to respective first and second chirp signals of FIG. 6, and a waveform of a composite beat signal resulted from compositing the first and second beat signals in accordance with embodiments of the present disclosure.
Figure 7:
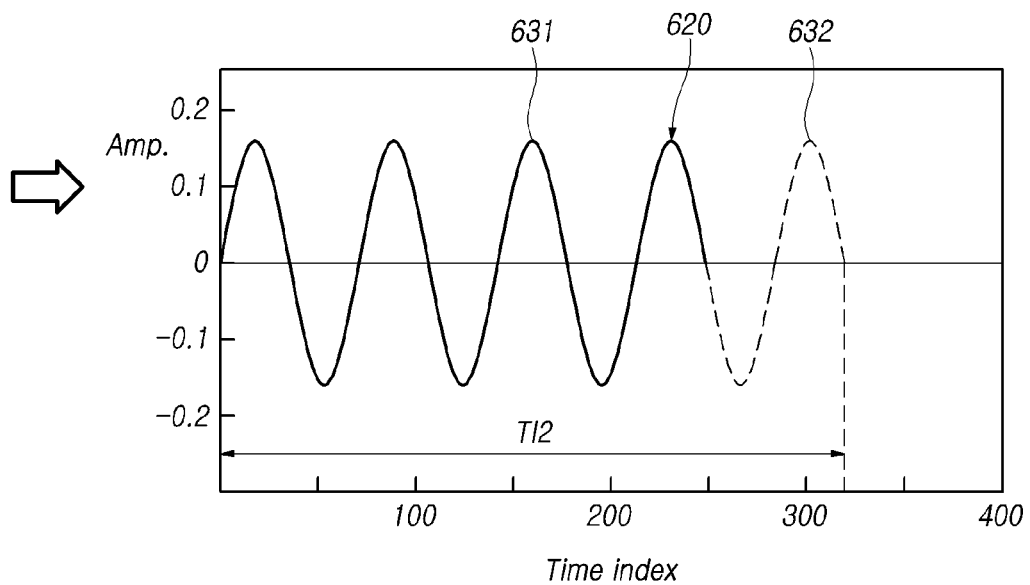

FIG. 6 illustrates an example of a signal waveform used in the radar sensor apparatus according to embodiments of the present disclosure, and more specifically, two chirp signals, parts of which overlap each other. FIG. 7 illustrates waveforms of first and second beat signals corresponding to respective first and second chirp signals in FIG. 6, and a waveform of a beat signal obtained by compositing the first and second beat signals.

As shown in FIGS. 6 and 7, the signal processor 300 according to embodiments of the present disclosure can composite beat signals for overlapped chirp signals and measure a range value with a high resolution. This operation of the signal processor will be described in detail below.

The signal processor 300 can transmit a signal using the frequency hopping technique as in FIG. 4. That is, as shown in FIG. 6, the signal processor can generate and transmit a plurality of chirp signals, each of which has a different center frequency from one or more previous chirp signal (s) for each modulation period while having an individual frequency band equal to the one or more previous chirp signal(s).

As shown in FIG. 6, each chirp signal is a signal, a frequency of which increases or decreases with an equal slope for an equal sweep time over an equal frequency bandwidth relative to one or more previous chirp signal(s). In this case, a frequency band/bandwidth of one chirp signal is represented by an individual frequency band BWe.

Further, center frequencies of respective chirp signals may be different from one another; however, embodiments of the present disclosure are not limited thereto. For example, center frequencies of two or more chirp signals may be equal.

That is, a FMCW radar in accordance with embodiments of the present disclosure has a signal waveform based on a fast chirp technique, and one or more center frequencies from the plurality of chirp signals may be different.

Further, the signal processor 300 derives a first chirp signal and a second chirp signal that overlap each other in a fractional frequency band of 0 or more among the plurality of chirp signals.

FIG. 6 illustrates the first chirp signal 510 and the second chirp signal 520 derived by such a technique, and a center frequency of the first chirp signal 510 and a center frequency of the second chirp signal 520 are represented by "fc1" and "fc2", respectively.

In this case, the first chirp signal 510 and the second chirp signal 520 include a frequency band of 0 or more overlapping with each other. The overlapping frequency bandwidth may be represented by "BWo". According to embodiments of the present disclosure, BWo may have a value of 0 or more and BWe or less.

A difference value between the center frequency of the first chirp signal 510 and the center frequency of the second chirp signal 520 may be represented by "$\Delta fc$", and may be expressed as $\Delta fc = (fc2 - fc1)$.

In this case, a relationship between the difference value between the center frequency of the first chirp signal 510 and the center frequency of the second chirp signal 520, $\Delta fc$, and the overlapping frequency band BWo is expressed as following Equation 3.

$$\Delta fc = BWe - BWo \, (0 \leq BWo \leq BWe) \quad \text{[Equation 3]}$$

Further, the entire frequency band occupied by the first chirp signal 510 and the second chirp signal may be represented by "$\Delta F$", and $\Delta F$ is expressed as following Equation 4.

$$\Delta F = 2BWe - BWo = BWe + \Delta fc \quad \text{[Equation 4]}$$

The signal processor 300 generates respective first and second beat signals corresponding to the derived first and second chirp signals 510 and 520, and determines a phase difference value between the first and second beat signals, $\Delta p$.

That is, the signal processor 300 generates a first beat signal 610 expressed as a solid line in the upper view of FIG. 7 by mixing a first chirp signal 510 transmitted and a received signal corresponding to the first chirp signal 510, and generates a second beat signal 610 expressed as a dotted line in the upper view of FIG. 7 by mixing a second chirp signal 520 transmitted and a received signal corresponding to the second chirp signal 520.

In this case, since center frequencies of the first chirp signal 510 and the second chirp signal 520 are spaced apart by $\Delta fc$ from each other, thus, the first beat signal 610 has the same beat frequency as the second beat signal 620 and has a certain phase difference from the second beat signal 620.

That is, each of the first beat signal 610 and the second beat signal 620 is a sinusoidal wave with a duration of TI1 over a time index and a beat frequency fb, and a starting position of the sinusoidal wave of the second beat signal become offset by a certain phase difference value $\Delta \varphi$ from a multiple of a wavelength of the first beat signal.

The phase difference value $\Delta \varphi$ between the first beat signal 610 and the second beat signal 620 may be expressed as following Equation 5.

$$\Delta \varphi = \frac{4\pi R}{c} \Delta fc = \frac{4\pi R}{c} (\Delta F - BWe) \quad \text{[Equation 5]}$$

As in Equation 5, the phase difference value Δφ between the first beat signal 610 and the second beat signal 620 is proportional to the product (R*Δfc) of a range value R of an object, and a center frequency difference value Δfc that is a difference value between a first center frequency fc1 of the first chirp signal and a second center frequency fc2 of the second chirp signal.

As described above, the signal processor 300 can determine a phase difference value Δφ between the first beat signal 610 and the second beat signal 620 based on a range value R to an object, which is determined through the processing for each chirp signal, and a center frequency difference value Δfc between the first chirp signal and the second chirp signal.

Thereafter, the signal processor 300 generates a composite beat signal by compensate for the phase difference value Δφ between the first beat signal and the second beat signal.

That is, in case the second beat signal is overlapped with the first beat signal by shifting the second beat signal 620 as in the upper view of FIG. 7 by the phase difference value Δφ in the time domain, a composite beat signal 630 can be generated as in the lower view of FIG. 7.

The composite beat signal 630 has a form in which the first beat signal and the second beat signal are connected to each other, and become a sinusoidal wave with a duration of TI2 greater than a duration of each beat signal over the time index and a beat frequency fb.

That is, the composite beat signal 630 can include a part of the first beat signal 631 and a part of the second beat signal 632 extending in the same phase as the first beat signal.

Thereafter, the signal processor 300 determines a high resolution range value R' of an object by using the generated composite beat signal 630.

The high resolution range value R' of the object is basically substantially the same as a range value R determined through the processing of each chirp signal, but is a more accurate value.

A difference value, ΔR', between the high resolution ranges R' to objects can be determined by following Equation 2.

$$\Delta R' = \frac{c}{2 \cdot \Delta F} \quad \text{[Equation 6]}$$

That is, the difference value ΔR' between the high resolution ranges R' determined by the composite beat signal is inversely proportional to ΔF which is the entire frequency band/bandwidth of two overlapping chirp signals.

Since the ΔF which is the entire frequency band/bandwidth of two overlapping chirp signals is greater than an individual frequency band BWe of each chirp signal, the difference value ΔR' between the high resolution range values R' determined by the composite beat signal is smaller than a difference value ΔR between range values R determined from each chirp signal.

Accordingly, 1/ΔR' which is a resolution of a high resolution range value R' determined by the composite beat signal is greater than 1/ΔR which is a resolution of a range value R determined from each chirp signal by Equation 2.

As a result, the resolution of the high resolution range value R' determined by the composite beat signal is greater than the resolution of the range value R determined from each chirp signal; therefore, the accuracy of the range value can be improved.

More specifically, ΔR' which is a difference value between the high resolution range values R' determined by the composite beat signal has a relationship as in following Equation 7 with the center frequency difference Δfc and the overlapping frequency band BWo.

$$\Delta R' = \frac{c}{2 \cdot \Delta F} = \frac{c}{2 \cdot (2BWe - BWo)} = \frac{c}{2 \cdot (BWe + \Delta fc)} \quad \text{[Equation 7]}$$

As a result, 1/ΔR' which is the resolution of the high resolution range value R' determined by the composite beat signal is proportional to the center frequency difference value Δfc that is the difference value between the first center frequency fc1 of the first chirp signal and the second center frequency fc2 of the second chirp signal.

In other words, 1/ΔR' which is the resolution of the high resolution range value R' determined by the composite beat signal may be proportional to a value (2BWe-BWo) obtained by subtracting the overlapping frequency band BWo from a value corresponding to two times the individual frequency band BWe.

As described above, in accordance with embodiments of the present disclosure, it is possible for the FMCW radar employing the frequency hopping technique to have improved range measurement accuracy by compositing beat signals of two or more chirp signals overlapping with one another in a part of the chirp signals, and determining a high resolution range value based on the composited beat signal.

Meanwhile, an algorithm of generating a composite beat signal and determining of a high resolution range value using the chirp signals overlapping with one another in a part of the chirp signals according to embodiments of the present disclosure may not substitute an object detection algorithm using each chirp signal; thus may be preferably used in additional to the object detection algorithm using each chirp signal.

That is, in an environment where more accurate range measurement is required, the algorithm according to the embodiments of the present disclosure may be further performed while the detection algorithm as described referring to FIG. 3 etc. for extracting information on a range to an object, or the like using each chirp signal is performed.

For example, in a situation where it is unclear whether an object detection peak extracted by performing the detection algorithm for extracting information on a range to an object, or the like using each chirp signal is a single object or multiple objects, by further performing the algorithm of generating the composite beat signal and determining of the high resolution range value using chirp signals overlapping with one another in a part of the chirp signals according to the embodiments of the present disclosure, it is possible to extract more accurately information on a range to an unclear object or the number of objects.

Figure 8:
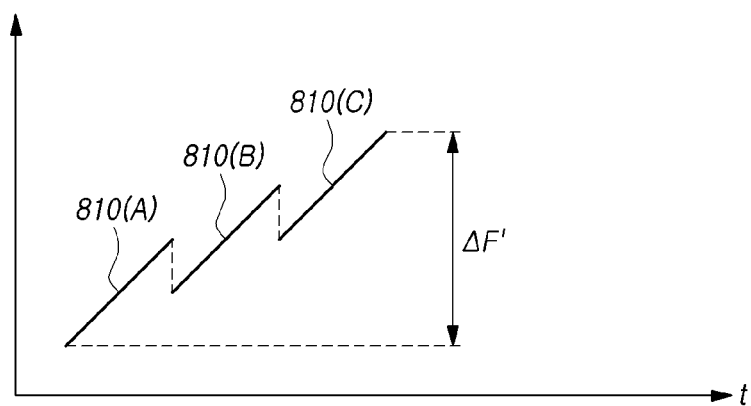
FIG. 8 illustrates signal waveforms according to another embodiment of the present disclosure, and when three chirp signals overlap one another, an example of compositing respective beat signals corresponding to the three chirp signals.
Figure 8:
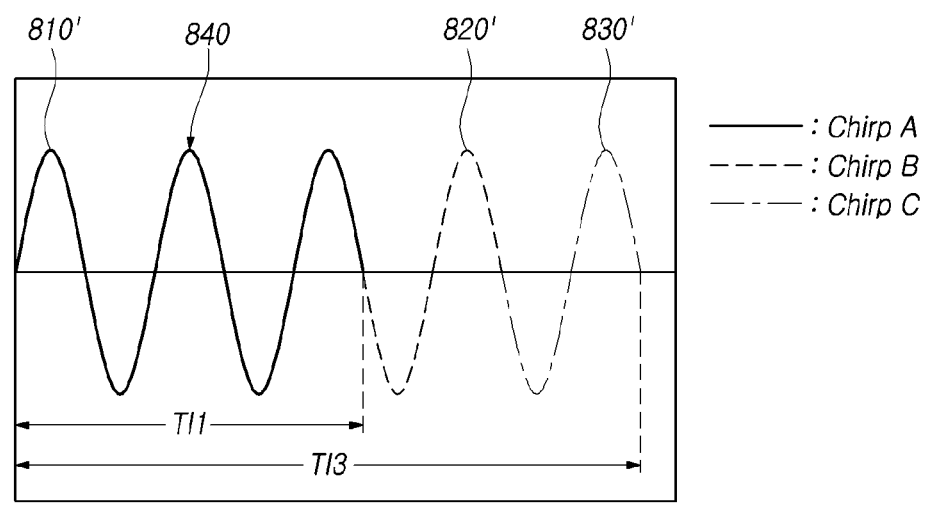

FIG. 8 illustrates signal waveforms according to another embodiment of the present disclosure, and when three chirp signals overlap one another, an example of compositing respective beat signals corresponding to the three chirp signals.

In FIGS. 6 and 7, the example of using two chirp signals overlapping with each other in a part of the chirp signals has been discussed; however, embodiments of the present disclosure are not limited thereto. For example, three or more chirp signals overlapping with one another in a part of the chirp signals can be used.

That is, the signal processor 300 can further comprise a function of deriving a third chirp signal that overlaps at least one of the first chirp signal or the second chirp signal in a fractional frequency band of 0 or more, and generating a third beat signal corresponding to the third chirp signal. The signal processor 300 can generate a composite beat signal by compensating at least one of the first beat signal, the second beat signal, or the third beat signal for a phase difference value between the third beat signal and at least one of the first beat signal or the second beat signal, and determine a high resolution range value based on the composite beat signal.

FIG. 8 illustrates such an example, the signal processor 300 derives a first chirp signal (Chirp A) 810, a second chirp signal (Chirp B) 820, a third chirp signal (Chirp C) 830, which overlap with one another in apart of the chirp signals, and generates a composite beat signal 840 by compensating for a phase difference value between beat signals of respective chirp signals.

The composite beat signal 840 in which three beat signals are composited has a form in which a first beat signal part 810' represented by a solid line, a second beat signal part 820' represented by a dotted line, and a third beat signal part 830' represented by a one-dot-chain line are connected to one another.

As a result, the composite beat signal 840 has a duration of TI3 greater than each beat signal in the time domain.

Further, since the entire frequency band of three chirp signals is expanded into ΔF', as a result, a resolution of a high resolution range value determined from a composite beat signal 840 can be improved in proportional to a magnitude of the ΔF' which is the entire frequency band of three chirp signals.

Figure 9:
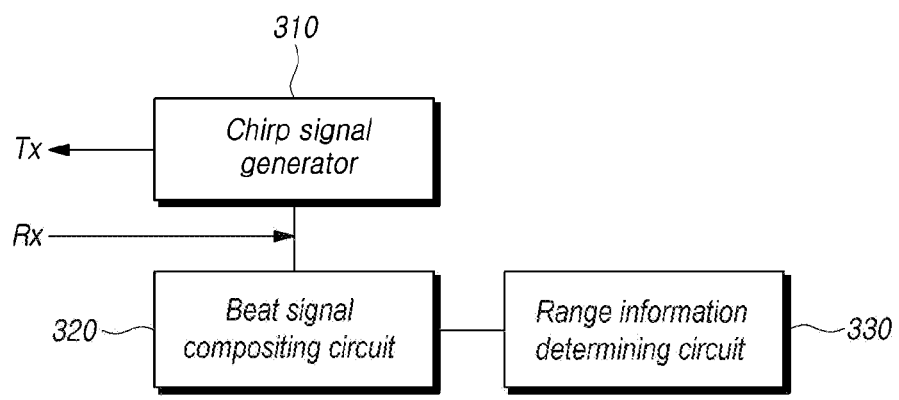
FIG. 9 is a functional block diagram illustrating a signal processing apparatus employed in the radar apparatus in accordance with embodiments of the present disclosure.

FIG. 9 is a functional block diagram illustrating a signal processing apparatus employed in the radar apparatus in accordance with embodiments of the present disclosure.

Referring to FIG. 9, in accordance with embodiments of the present disclosure, a signal processing apparatus for a vehicle-mounted radar sensor is provided that comprises a signal generator 310 generating and transmitting a plurality of chirp signals, each of which has a different center frequency from one or more previous chirp signal (s) for each modulation period while having an individual frequency band equal to the one or more previous chirp signal(s), a beat signal compositing circuit 320 deriving first and second chirp signals that overlap each other in a fractional frequency band of 0 or more among the plurality of chirp signals, determining a phase difference value between a first beat signal corresponding to the first chirp signal and a second beat signal corresponding to the second chirp signal, and generating a composite beat signal by compensating at least one of the first beat signal and the second beat signal for the phase difference value between the first beat signal and the second beat signal, and a range information determining circuit 330 determining a range value of an object having a range resolution greater than a range resolution by the individual frequency band by using the composite beat signal.

The signal processor or the signal processing apparatus employed in the vehicle-mounted radar sensor apparatus according to embodiments of the present disclosure, or the signal generator 310, the beat signal compositing circuit 320, and the range information determining circuit 330, which are used for the signal processor or the signal processing system. may be implemented in i) one or more module(s) of the vehicle-mounted radar sensor apparatus according to embodiments of the present disclosure, ii) a part of the one or more module(s), or iii) an electronic or controlling circuitry ECU including at least one of the signal processor, the signal processing apparatus, the signal generator 310, the beat signal compositing circuit 320, or the range information determining circuit 330.

The module or the electronic or controlling circuitry ECU constituting the vehicle-mounted radar sensor apparatus can comprise a storage device, such as a processor, a memory, or the like, or a computer program for executing a specific functionality, or the like. The signal processor or the signal processing apparatus, or the signal generator 310, the beat signal compositing circuit 320, and the range information determining circuit 330, which are used for the signal processor or the signal processing apparatus, may be implemented as software modules capable of performing their respective functions.

It is possible for those skilled in the art to code such software based on description, embodiments, or example described herein; therefore, omitted is detailed discussion on the software.

Further, the signal processing apparatus as shown in FIG. 9 may be implemented as a part of the radar sensor apparatus; however, embodiments of the present disclosure are not limited thereto. For example, the signal processing apparatus may be implemented as one module in which one or more driver assistance system(s) of the vehicle are implemented, or as one or more module(s), or a part of a module, of a domain control system that collectively controls a plurality of driver assistance systems.

Figure 10:
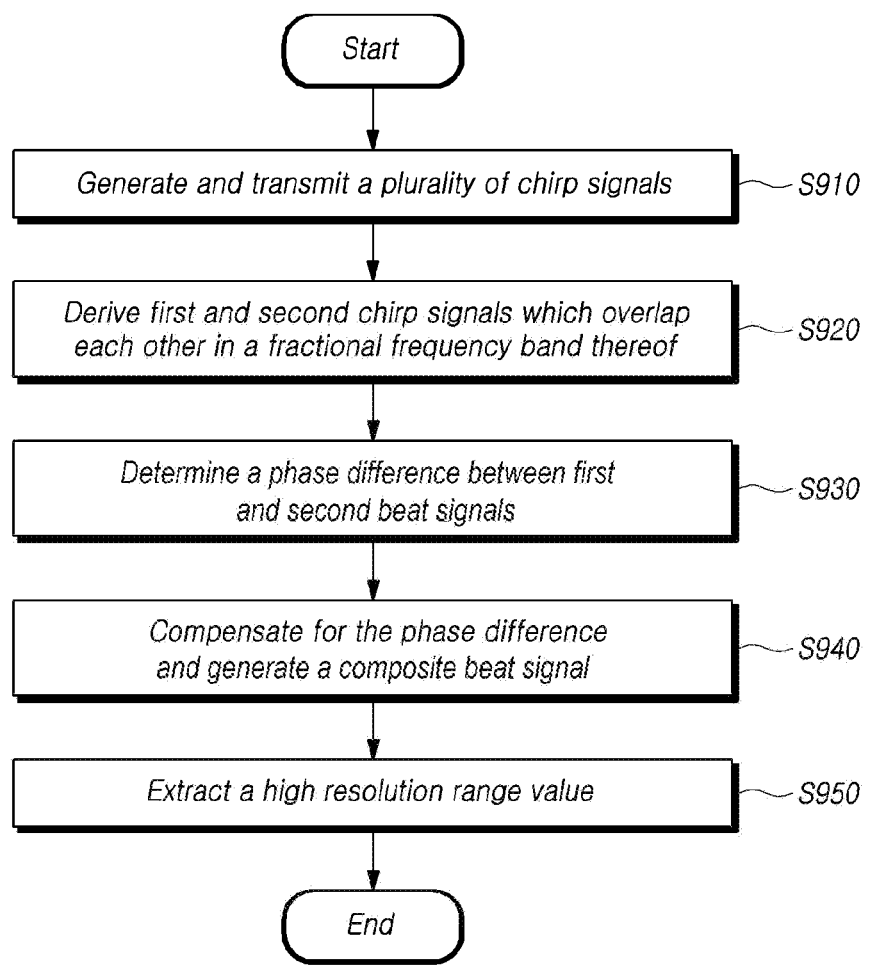
FIG. 10 is a flow diagram illustrating a method of detecting an object by the radar apparatus in accordance with embodiments of the present disclosure.

FIG. 10 is a flow diagram illustrating a method of detecting an object by the radar apparatus in accordance with embodiments of the present disclosure.

In accordance with embodiments of the present disclosure, as illustrated in FIG. 10, a method of detecting an object is provided that comprises: generating and transmitting S910 a plurality of chirp signals, each of which has a different center frequency from one or more previous chirp signal(s) for each modulation period while having an individual frequency band equal to the one or more previous chirp signal(s), deriving S920 first and second chirp signals that overlap each other in a fractional frequency band of 0 or more among the plurality of chirp signals, determining S930 a phase difference value between a first beat signal corresponding to the first chirp signal and a second beat signal corresponding to the second chirp signal, and generating S940 a composite beat signal by compensating at least one of the first beat signal and the second beat signal for the phase difference value between the first beat signal and the second beat signal, and determining S950 a range value of an object having a range resolution greater than a range resolution by the individual frequency band by using the composite beat signal.

Each step of the detection method can be performed by the functionality of the signal processor 300 described above; therefore, detailed description is omitted to avoid duplication.

As described above, in accordance with embodiments of the present disclosure, it is possible to provide a radar apparatus capable of improving a resolution for detecting an object by expanding a frequency band in the FMCW radar employing the frequency hopping technique.

That is, it is possible to provide an effect of improving the radar resolution by extending a frequency bandwidth with chirp signals, parts of respective frequency bands of which overlap one another.

More specifically, in the FMCW radar apparatus employing the frequency hopping technique in which a center frequency of each chirp signal is variable, it is possible to improve the accuracy of range measurement of the radar, by determining a beat signal for each of a plurality of chirp signals, parts of respective frequency bands of which overlap one another, compensating the beat signal for a phase difference value, and generating a composite beat signal.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s). Further, each of the configurations or elements included in one or more of the embodiments may be implemented by an independent hardware configuration; however, some or all of the configurations or elements may be selectively combined and implemented by one or more computer program(s) having one or more program module (s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms "include," "comprise," "constitute," "have," and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The scope of protection of the present disclosure should be construed based on the following claims, and all technical ideas within the scope of equivalents thereof should be construed as being included within the scope of the present disclosure.

What is claimed is:

1. A radar apparatus comprising:
an antenna assembly;
a signal transceiver transmitting a linear frequency modulation signal and receiving a signal reflected from an object via the antenna assembly; and
a signal processor extracting information on the object by controlling the signal transceiver and processing the received reflected signal,
wherein the signal transceiver is configured to
generate a plurality of chirp signals, each of which has a different center frequency from one or more previous chirp signals for each modulation period while having an individual frequency band equal to the one or more previous chirp signals,
transmit via the antenna assembly the plurality of chirp signals, and
receive via the antenna assembly the plurality of chirp signals reflected back at the radar apparatus,
wherein the signal processor comprises:
a function of deriving a first chirp signal and a second chirp signal that overlap each other in a fractional frequency band of 0 or more among the plurality of chirp signals,
a function of determining a phase difference value between a first beat signal corresponding to the first chirp signal and a second beat signal corresponding to the second chirp signal,
a function of generating a composite beat signal by compensating at least one of the first beat signal and the second beat signal for the phase difference value between the first beat signal and the second beat signal, and
a function of determining a high resolution range value of the object by using the composite beat signal, and
wherein the signal processor performs a detection algorithm for extracting information on the object determined by using each chirp signal, and only when an object detection peak obtained by performing the detection algorithm is not clear whether the object detection peak is a single object or a plurality of objects, performs the function of generating the composite beat signal by using overlapping chirp signals and the function of determining the high resolution range value.

2. The radar apparatus according to claim 1, wherein the signal processor further comprises a function of deriving a third chirp signal that overlaps at least one of the first chirp signal or the second chirp signal in the fractional frequency band of 0 or more, and generating a third beat signal corresponding to the third chirp signal, and generates a composite beat signal by compensating at least one of the first beat signal, the second beat signal, or the third beat signal for a phase difference value between the third beat signal and at least one of the first beat signal or the second beat signal.

3. The radar apparatus according to claim 1, wherein the phase difference value is proportional to product ($R*\Delta fc$) of the range value R of the object and a center frequency difference value $\Delta fc$ that is a difference value between a first center frequency c1 of the first chirp signal and a second center frequency c2 of the second chirp signal.

4. The radar apparatus according to claim 1, wherein a resolution of the high resolution range value determined by the composite beat signal is proportional to a center frequency difference value $\Delta fc$ that is a difference value between a first center frequency c1 of the first chirp signal and a second center frequency c2 of the second chirp signal.

5. The radar apparatus according to claim 1, wherein a resolution of the high resolution range value determined by the composite beat signal is proportional to a value (2BWe-BWo) obtained by subtracting an overlapping frequency band BWo from a value corresponding to two times the individual frequency band BWe.

6. A signal processing apparatus for a radar sensor for a vehicle, the signal processing apparatus comprising:
a signal generator generating and transmitting a plurality of chirp signals, each of which has a different center frequency from one or more previous chirp signals for each modulation period while having an individual frequency band equal to the one or more previous chirp signals;
a beat signal compositing circuit deriving a first chirp signal and a second chirp signal that overlap each other in a fractional frequency band of 0 or more among the plurality of chirp signals, determining a phase difference value between a first beat signal corresponding to the first chirp signal and a second beat signal corresponding to the second chirp signal, and generating a composite beat signal by compensating at least one of the first beat signal and the second beat signal for the phase difference value between the first beat signal and the second beat signal; and
a range information determining circuit determining a high resolution range value of an object having a range resolution greater than a range resolution by the individual frequency band by using the composite beat signal,
wherein the range information determining circuit performs a detection algorithm for extracting information on the object determined by using each chirp signal, and only when an object detection peak obtained by performing the detection algorithm is not clear whether the object detection peak is a single object or a plurality of objects, performs a function of generating the composite beat signal by using overlapping chirp signals and a function of determining the high resolution range value.

7. The signal processing apparatus according to claim 6, wherein the signal compositing circuit further comprises a function of deriving a third chirp signal that overlaps at least one of the first chirp signal or the second chirp signal in the fractional frequency band of 0 or more, and generating a third beat signal corresponding to the third chirp signal, and generates a composite beat signal by compensating at least one of the first beat signal, the second beat signal, or the third beat signal for a phase difference value between the third beat signal and at least one of the first beat signal or the second beat signal.

8. The signal processing apparatus according to claim 6, wherein the phase difference value is proportional to product (R*Δfc) of the range value R of the object and a center frequency difference value Δfc that is a difference value between a first center frequency c1 of the first chirp signal and a second center frequency c2 of the second chirp signal.

9. The signal processing apparatus according to claim 6, wherein a resolution of the high resolution range value determined by the composite beat signal is proportional to a center frequency difference value Δfc that is a difference value between a first center frequency c1 of the first chirp signal and a second center frequency c2 of the second chirp signal.

10. The signal processing apparatus according to claim 6, wherein a resolution of the high resolution range value determined by the composite beat signal is proportional to a value (2BWe-BWo) obtained by subtracting an overlapping frequency band BWo from a value corresponding to two times the individual frequency band BWe.

11. A method of detecting an object comprising:
generating and transmitting a plurality of chirp signals, each of which has a different center frequency from one or more previous chirp signals for each modulation period while having an individual frequency band equal to the one or more previous chirp signals;
deriving a first chirp signal and a second chirp signal that overlap each other in a fractional frequency band of 0 or more among the plurality of chirp signals;
determining a phase difference value between a first beat signal corresponding to the first chirp signal and a second beat signal corresponding to the second chirp signal;
generating a composite beat signal by compensating at least one of the first beat signal and the second beat signal for the phase difference value between the first beat signal and the second beat signal; and
determining a high resolution range value of the object having a range resolution greater than a range resolution by the individual frequency band by using the composite beat signal,
wherein the generating of the composite beat signal by using overlapping chirp signals and the determining of the high resolution range value are performed only when a detection algorithm is performed for extracting information on the object determined by using each chirp signal, and an object detection peak obtained by performing the detection algorithm is not clear whether the object detection peak is a single object or a plurality of objects.

12. The method of detecting the object according to claim 11, wherein the phase difference value is proportional to product (R*Δfc) of the range value R of the object and a center frequency difference value Δfc that is a difference value between a first center frequency c1 of the first chirp signal and a second center frequency c2 of the second chirp signal.

13. The method of detecting the object according to claim 11, wherein a resolution of the high resolution range value determined by the composite beat signal is proportional to a center frequency difference value Δfc that is a difference value between a first center frequency c1 of the first chirp signal and a second center frequency c2 of the second chirp signal.

14. The method of detecting the object according to claim 11, wherein a resolution of the high resolution range value determined by the composite beat signal is proportional to a value (2BWe-BWo) obtained by subtracting an overlapping frequency band BWo from a value corresponding to two times the individual frequency band BWe.

* * * * *